United States Patent
Cooper et al.

(10) Patent No.: US 10,120,784 B2
(45) Date of Patent: *Nov. 6, 2018

(54) TEST CASE GENERATION FOR UNCOVERED CODE PATHS

(71) Applicant: INTERNATIONAL BUSINESS MACHINES CORPORATION, Armonk, NY (US)

(72) Inventors: Steven Cooper, Ontario (CA); Michael S. Fulton, Squamish (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/968,775

(22) Filed: May 2, 2018

(65) Prior Publication Data

US 2018/0225196 A1 Aug. 9, 2018

Related U.S. Application Data

(63) Continuation of application No. 15/657,387, filed on Jul. 24, 2017, now Pat. No. 9,996,452, which is a continuation of application No. 15/227,317, filed on Aug. 3, 2016, now Pat. No. 9,990,272.

(51) Int. Cl.
*G06F 11/36* (2006.01)
*G06F 9/44* (2018.01)

(52) U.S. Cl.
CPC ...... *G06F 11/3676* (2013.01); *G06F 11/3684* (2013.01)

(58) Field of Classification Search
None
See application file for complete search history.

(56) References Cited

U.S. PATENT DOCUMENTS

| | | |
|---|---|---|
| 5,778,169 A | 7/1998 | Reinhardt |
| 6,523,169 B1 | 2/2003 | Glunz |
| 7,089,534 B2 | 8/2006 | Hartman et al. |
| 7,886,272 B1 | 2/2011 | Episkopos et al. |
| 8,381,184 B2 | 2/2013 | Johnson et al. |
| 8,819,642 B2 | 8/2014 | Bhat et al. |

(Continued)

OTHER PUBLICATIONS

Cooper et al., "Test Case Generation for Uncovered Code Paths", U.S. Appl. No. 15/968,784, filed May 2, 2018, 19 pages.

(Continued)

*Primary Examiner* — Daxin Wu
(74) *Attorney, Agent, or Firm* — Brian M. Restauro

(57) ABSTRACT

Embodiments of the present invention provide methods, computer program products, and systems to increase code coverage. Embodiments of the present invention can receive a copy of source code and data associated with a sample execution of a set of instructions specified by the copy of the source code. Embodiments of the present invention can insert, into the set of instructions specified by the copy of the source code, an instruction that corresponds to a code statement that precedes an untraversed code path within the received copy of the source code. Embodiments of the present invention can execute the set of instructions that include the inserted instruction and provide an option to redirect execution of the set of instructions at the inserted instruction. Embodiments of the present invention can generate a test case that increases code coverage based on the redirected execution of the set of instructions.

1 Claim, 4 Drawing Sheets

(56) References Cited

U.S. PATENT DOCUMENTS

| | | |
|---|---|---|
| 9,507,696 B2 | 11/2016 | Sinha et al. |
| 2010/0058295 A1 | 3/2010 | Johnson et al. |
| 2012/0304010 A1 | 11/2012 | Opstad et al. |
| 2013/0298110 A1 | 11/2013 | Boden et al. |
| 2014/0109099 A1 | 4/2014 | Filachek et al. |
| 2014/0304688 A1 | 10/2014 | Bhat et al. |
| 2015/0347278 A1 | 12/2015 | Sinha et al. |
| 2018/0039568 A1 | 2/2018 | Cooper et al. |
| 2018/0039569 A1 | 2/2018 | Cooper et al. |

OTHER PUBLICATIONS

Appendix P—List of IBM Patents or Patent Applications Treated as Related, Filed herewith, 2 Pages.

TEST CASE GENERATION FOR UNCOVERED CODE PATHS

BACKGROUND

The present invention relates generally to the field of code debugging, and more particularly to achieving high levels of code coverage.

In general, code coverage is a software quality tool used to determine the amount of code statements tested by corresponding test cases. Test cases are typically used to determine whether a code statement functions as the software developer intended. Attaining a high level of code coverage is typically achieved by creating test cases during the development of a software component. A software component is part of a program used by a computing device. In order to generate a test case, the tester must first identify the objective of the code statement, that is, what the code statement to be tested is meant to achieve. The tester can then identify if the code statement fulfills its objective. For example, if a code statement is meant to increment the value of a variable, a test case for the code statement can be displaying the value of the variable before and after the corresponding code statement is executed to ensure the variable has been incremented as expected by the tester.

SUMMARY

Embodiments of the present invention provide methods, computer program products, and systems to increase code coverage. In one embodiment, a method is provided comprising: receiving a copy of source code and data associated with a sample execution of a set of instructions specified by the copy of the source code; inserting, into the set of instructions specified by the copy of the source code, an instruction that corresponds to a code statement that precedes an untraversed code path within the received copy of the source code, as identified by the data associated with the sample execution; executing the set of instructions that include the inserted instruction; providing an option to redirect execution of the set of instructions at the inserted instruction; and generating a test case that increases code coverage based on the redirected execution of the set of instructions.

DETAILED DESCRIPTION

Embodiments of the present invention recognize the problem of reaching complete code coverage of a software component. The difficulty of achieving complete code coverage stems from the need to generate test cases for code paths which are visited infrequently or not at all. For example, in some instances, a code path may be written to deal with certain exceptions or errors. If these exceptions or errors occur infrequently, it is difficult to compose a test case which traverses that code path. Furthermore, difficulty in achieving complete code coverage stems from the need for test cases to be tailored to specific code statements, which may vary between software components. Embodiments of the present invention provide solutions for increasing code coverage. As described in greater detail later in this specification, embodiments of the present invention can be used to mark code statements that precede untraversed code paths, allowing the user to redirect execution onto a potentially uncovered code path in order to generate a test case. Herein, an "uncovered code path", also referred to as "uncovered code statements", refers to a series of code statements for which there is no test case to cause the execution of these code statements. Herein, a "test case" refers to a set of code statements that comprise a repeatable test designed to determine whether a subset of a software component functions as intended. Embodiments of the present invention are compatible with all programming languages for which there exists any debugger that is able to store and replay user-generated modifications to source code.

Figure 1:
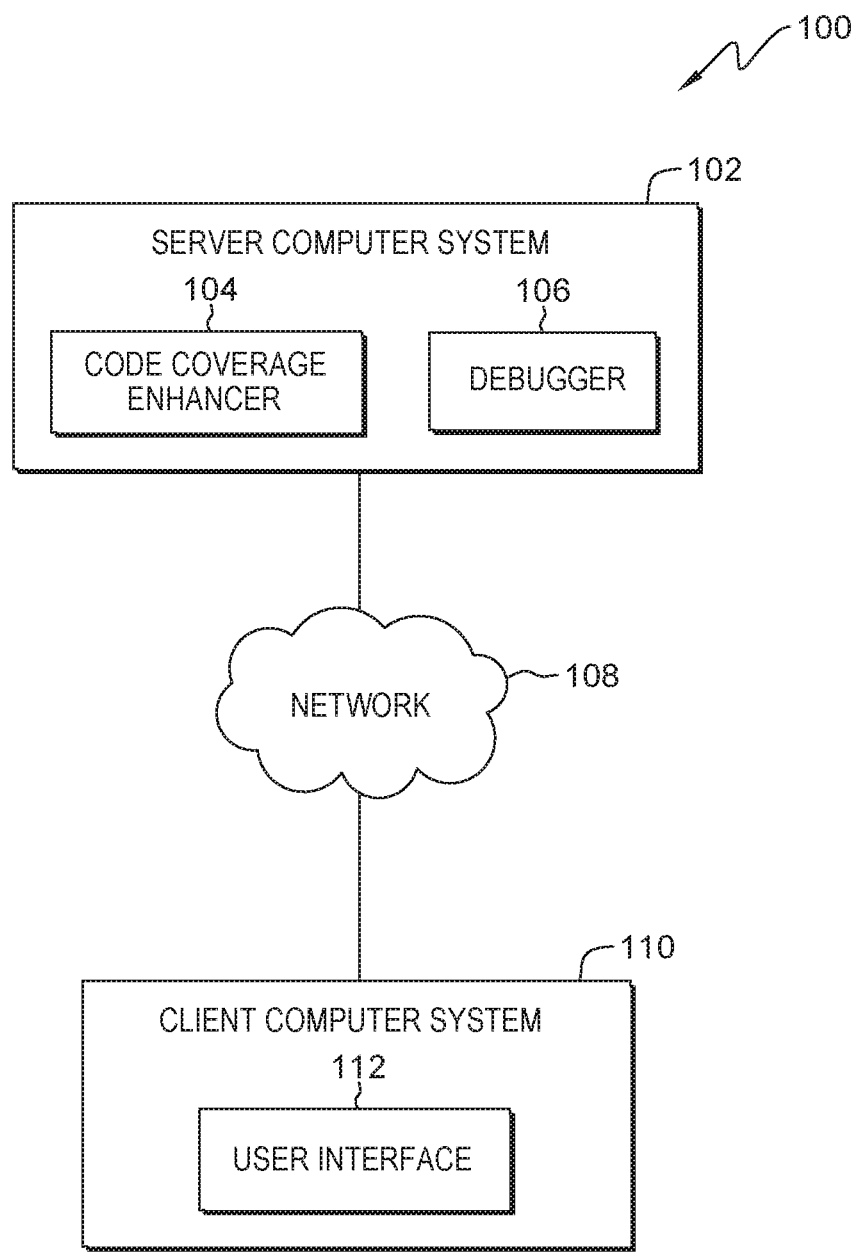
FIG. 1 is a block diagram of a computing environment, in accordance with an embodiment of the present invention.

FIG. 1 is a block diagram of computing environment 100, in accordance with an embodiment of the present invention. Computing environment 100 includes server computer system 102 and client computer system 110. Server computer system 102 and client computer system 110 can be desktop computers, laptop computers, specialized computer servers, or any other computer systems known in the art. In certain embodiments, server computer system 102 and client computer system 110 represent computer systems utilizing clustered computers and components to act as a single pool of seamless resources when accessed through network 108 For example, such embodiments may be used in data centers, cloud computing, storage area network (SAN), and network attached storage (NAS) applications. In certain embodiments, server computer system 102 and client computer system 110 represent virtual machines. In general, server computer system 102 and client computer system 110 are representative of any electronic devices, or combination of electronic devices, capable of executing machine-readable program instructions, as described in greater detail with regard to FIG. 5.

Server computer system 102 includes code coverage enhancer 104 and debugger 106. Code coverage enhancer 104 is responsible for communicating with user interface 112, identifying breakpoints, generating a script to store user actions, generating test cases, and transmitting the generated test case to user interface 112. Herein, a "breakpoint" refers to a code statement at which execution of the set of instructions specified by the source code will be suspended. Herein, "user actions" refer to one or more actions received from user interface 112. For example, a user action can include a command issued by the user to install a breakpoint at a specified line number in the code, modify the value of a variable, or jump to a new code statement, bypassing one or more source statements that are not executed. Code coverage enhancer 104 receives code coverage results and a copy of the source code from user interface 112 via network 108. Herein, "code coverage results" refer to data, gained through a sample execution of the set of instructions specified by the source code, that indicates which code statements were visited during the sample execution. In this embodiment, the location of breakpoints is identified by code coverage enhancer 104 through the analysis of received code coverage results. In other embodiments, code coverage enhancer 104 can also generate code coverage results in response to receiving the copy of the source code from user interface 112. In other words, code coverage enhancer can execute the set of instructions specified by the received copy of the source code in order to generate code coverage results, as opposed to directly receiving the code coverage results. In other embodiments, code coverage enhancer 104 can, in response to receiving source code from user interface 112 via network 108, generate a copy of the received source code, as opposed to directly receiving a copy of the source code.

Figure 2:
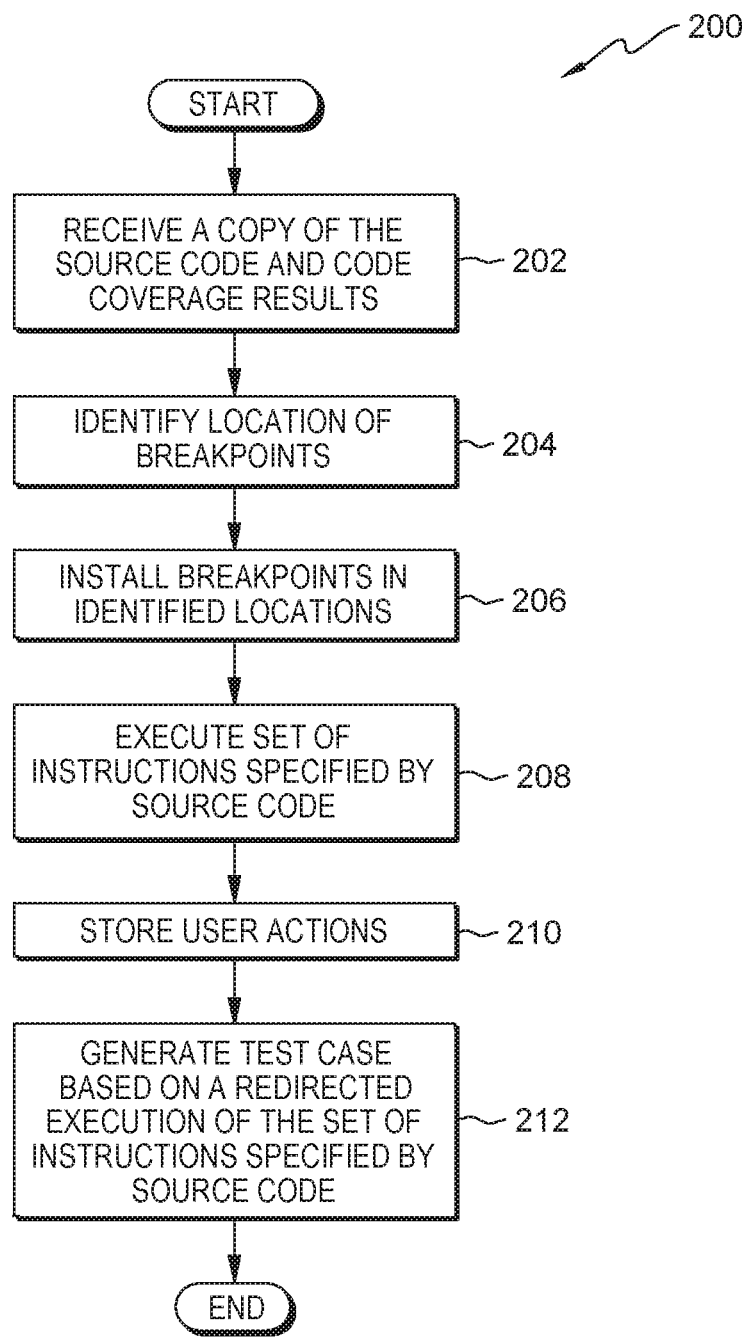
FIG. 2 is a flowchart illustrating operational steps for increasing code coverage, in accordance with an embodiment of the present invention.
Figures 3, 4:
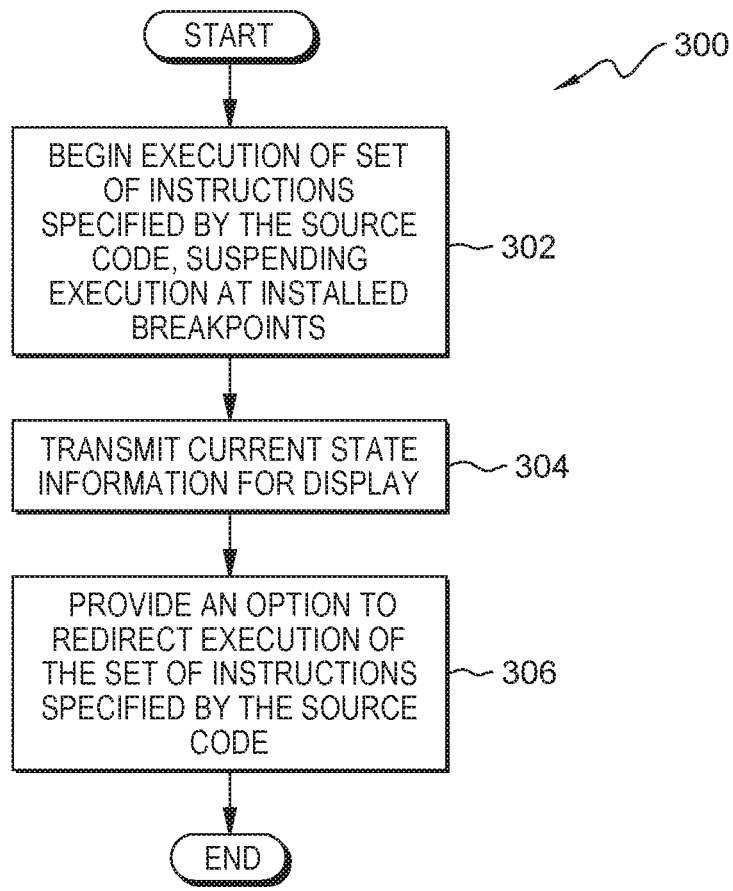
FIG. 3 is a flowchart illustrating operational steps for executing the set of instructions that corresponds to a received copy of source code, in accordance with an embodiment of the present invention.
FIG. 4 is an example of a code fragment including locations of installed breakpoints, in accordance with an embodiment of the present invention.

Code coverage enhancer 104 can generate a recommendation based, at least in part, on actions performed by debugger 106, as discussed in greater detail with regard to FIGS. 2 and 3. In this embodiment, a recommendation can be a set of identified test cases that helps achieve covering uncovered code paths. In other embodiments, a recommendation can be a generated test case that covers uncovered code paths based on the identified breakpoints and user actions.

In other embodiments, code coverage enhancer 104 can identify potential breakpoints from code coverage results and the copy of the source code automatically. For example, code coverage enhancer 104 can identify code statements in the copy of the source code which will cause one or more untraversed code paths through various machine learning techniques, as discussed in greater detail with regard to FIG. 4. Code coverage enhancer 104 can then transmit the generated test case to user interface 112 via network 108.

Debugger 106 is responsible for installing breakpoints in locations specified by code coverage enhancer 104. Herein, "installing a breakpoint" refers to the debugger marking a certain line of code as a breakpoint by inserting an instruction to suspend execution into the set of instructions specified by the copy of the source code. In this embodiment, debugger 106 installs breakpoints at code statements that precede untraversed code paths. Code coverage enhancer 104 specifies the locations in which breakpoints are to be installed, through the analysis of the code coverage results. In this embodiment, debugger 106 also installs breakpoints at locations specified by the user. Debugger 106 is also responsible for executing the set of instructions specified by the source code, as described in greater detail with regard to FIG. 3. Debugger 106 is also responsible for transmitting the program's state information to code coverage enhancer 104 for display and optionally redirecting the execution of the instructions specified by the copy of the source code. Herein, "state information" refers to the data associated with a program's execution. For example, state information can include the location of execution within the program, information regarding writeable memory, and the values of the program's variables.

Client computer system 110 includes user interface 112. User interface 112 enables client computer system 110 to access code coverage enhancer 104. User interface 112 communicates with code coverage enhancer 104 via network 108 to send data that includes code coverage results and the copy of the source code. User interface 112 receives test cases generated, or otherwise selected, by code coverage enhancer 104. For example, user interface 112 can be implemented using a browser and web portal or any program that can transmit data from server computer system 102 to client computer system 110.

Network 108 can be, for example, a local area network (LAN), a wide area network (WAN) such as the Internet, or a combination of the two, and include wired, wireless, or fiber optic connections. In general, network 108 can be any combination of connections and protocols that will support communications between server computer system 102 and client computer system 110, in accordance with a desired embodiment of the invention.

For illustrative purposes, the following discussion is made with respect to code coverage enhancer 104 and debugger 106 residing on server computer system 102. However, it should be understood that code coverage enhancer 104, debugger 106, and user interface 112 can reside on the same computer system (e.g., client computer system 110). In other embodiments, debugger 106 may be included as a component of code coverage enhancer 104.

FIG. 2 is a flowchart 200, illustrating operational steps for increasing code coverage, in accordance with an embodiment of the present invention.

In step 202, code coverage enhancer 104 receives a copy of the source code and code coverage results. In this embodiment, code coverage enhancer 104 receives a copy of the source code and code coverage results from user interface 112 via network 108. As mentioned before, "code coverage results" refers to data gained through a sample execution of the set of instructions specified by the source code that indicates which code statements were visited during the sample execution. In other embodiments, code coverage enhancer 104 can receive code coverage results and the copy of the source code from one or more other components of computing environment 100. In other embodiments, code coverage enhancer 104 can generate code coverage results in response to receiving a copy of source code from user interface 112 by executing the set of instructions specified by the received copy of the source code.

In step 204, code coverage enhancer 104 identifies locations of breakpoints. In this embodiment, code coverage enhancer 104 identifies locations of breakpoints by identifying code statements which precede untraversed code paths, according to the existing code coverage results. In other embodiments, code coverage enhancer 104 can automatically identify locations of potential breakpoints, without the use of the code coverage results, by recognizing certain patterns in the copy of the source code. For example, code coverage enhancer 104 can analyze the copy of the source code and recognize a conditional if/else statement as a potential breakpoint, as described in greater detail with regard to FIG. 4.

In step 206, code coverage enhancer 104 calls debugger 106 to install breakpoints at identified locations. In this embodiment, debugger 106 installs breakpoints at the identified locations by inserting an instruction to suspend execution to the set of instructions specified by the copy of the source code. In this embodiment, the user can issue a command to install a breakpoint at a specified line number in the source code. Debugger 106 can then install the breakpoint at the specified line number.

In step 208, code coverage enhancer 104 calls debugger 106 to execute the set of instructions specified by the source code. In this embodiment, debugger 106 causes the set of instructions specified by the source code to be executed by signaling a processing unit (e.g. processor(s) 504) of server computer system 102 to perform the instructions specified by the code. Debugger 106 also signals the processing unit to suspend performance of the instructions upon encountering a breakpoint. Debugger 106 can then transmit the program's state information to code coverage enhancer 104 for display, and optionally redirect the execution of the instructions based, at least in part, on user actions. In this embodiment, debugger 106 both signals the processing unit to suspend instruction performance and transmits the program's state information at every breakpoint encountered during the execution of the set of instructions specified by the source code. For example, where there are two breakpoints, debugger 106 can suspend instruction performance at each of the respective breakpoints and transmit the program's state information associated with the respective breakpoints. A user can then manipulate the program's state information to traverse uncovered code paths of the respective breakpoints. Accordingly, the test case generated or otherwise selected can address the uncovered code paths.

In step 210, code coverage enhancer 104 stores user actions. In this embodiment, code coverage enhancer 104 stores user actions by appending the user actions to a script generated by code coverage enhancer 104. For example, a user action can include a command issued by the user to modify the value of a variable located at a specified line number in the copy of the source code. In response to this command, code coverage enhancer 104 can then add a line of code to the generated script which corresponds to the user action.

In step 212, code coverage enhancer 104 generates a new test case based on the redirected execution of the set of instructions specified by the source codes. In this embodiment, code coverage enhancer 104 generates a new test case by using the stored user actions and the installed breakpoints to redirect execution of the set of instructions. In this embodiment, the test case comprises the input to the program for which the test case is generated, the copy of the source code, a test environment, and the generated script, which includes the user actions. Herein, a "test environment" refers to the system dependencies required to execute the source code and the user actions. Given the stored user actions and the installed breakpoints, the test case can be replayed by debugger 106, without the need for further user interaction. Accordingly, the newly generated test case increases code coverage by taking into account the modified state information and user actions to traverse and cover code paths that were previously uncovered.

FIG. 3 is a flowchart 300 illustrating operational steps for executing the set of instructions that corresponds to a received copy of source code, in accordance with an embodiment of the present invention.

In step 302, debugger 106 begins execution of the set of instructions specified by the source code, suspending execution at installed breakpoints. As mentioned before, the role of debugger 106 in the execution of the set of instructions includes signaling the processing unit (e.g., processor(s) 504) of server computer system 102 to perform the instructions specified by the code. Debugger 106 signals the processing unit to suspend the performance of the instructions when an installed breakpoint is encountered. For example, there can be multiple lines of code preceding the first breakpoint to be encountered. The instructions associated with these lines of code are first executed before debugger 106 suspends execution at the first breakpoint encountered.

In step 304, debugger 106 transmits to user interface 112 the program's current state information at the time the execution of the set of instructions specified by the source code was suspended. In this embodiment, debugger 106 records the current state information and transmits this information to user interface 112 for display, via network 108. User interface 112 then displays the state information associated with the executed set of instructions.

In step 306, debugger 106 provides the user with an option to redirect the execution of the set of instructions specified by the source code. In this embodiment, code coverage enhancer 104 provides the user the option to redirect the execution of the set of instructions by providing the user the option to modify the state information associated with the executed set of instructions. Debugger 106 can also identify the code path that corresponds to the modified state information. Once debugger 106 has identified the code path corresponding to the modified state information, it redirects the execution of the set of instructions to traverse that code path, as described in greater detail with regarded to FIG. 4. In this embodiment, when a breakpoint is encountered and the execution of the set of instructions is suspended, the user can also issue a command to debugger 106, via user interface 112, to resume execution of the set of instructions at a location after the breakpoint.

FIG. 4 is an example of code fragment 400 illustrating the location of an installed breakpoint, in accordance with an embodiment of the present invention. This example shows a conditional if/else statement 402 which provides instructions to traverse a certain path based on the condition being satisfied. In this example, if the value of "x" is "true", then the program will execute statement 406 (e.g., the if-clause). If the value for "x" is not "true" the program will execute statement 408 (e.g., the else-clause). Thus, in this example, the if/else statement (e.g., if/else statement 402) represents a code statement which may precede an untraversed code path because only one path may be traversed according to the value of "x".

In this example, breakpoint 404 is installed and execution of the copy of the source code has been suspended at breakpoint 404. The user can resume execution directly at either statement 406 or 408. Prior to resuming execution at the specified location (e.g., breakpoint 404), the user can modify the current state information. In this example, the value of variable "x" could be modified in order to correspond with the logical flow imposed by the if/else statement. The user can also redirect execution of the code by first modifying the state of variables to correspond to a certain code path. For example, if execution is suspended at breakpoint 404, the user can modify the value of variable "x", effectively choosing which statement, 404 or 406, is executed. The state of variables is modified by interacting with user interface 112. User interface 112 then transmits user actions to debugger 106, via network 108, which modifies the variables specified by the user actions.

In this example, statement 406 is traversed more frequently than statement 408. In this instance the software developer may not have generated a test case for statement 408, as this code statement is not likely to be executed. In this example, statement 408 represents an uncovered code path. Continuing the example, debugger 106 installs breakpoint 404 before the conditional block (e.g., if/else statement 402). Upon execution of instructions specified by code fragment 400, debugger 106 suspends execution at breakpoint 404. The user is then provided the option to redirect execution of code fragment 400. In this example, the user is provided to option to redirect execution to the uncovered code path (e.g., code statement 408), and generate a test case for this code statement.

Figure 5:
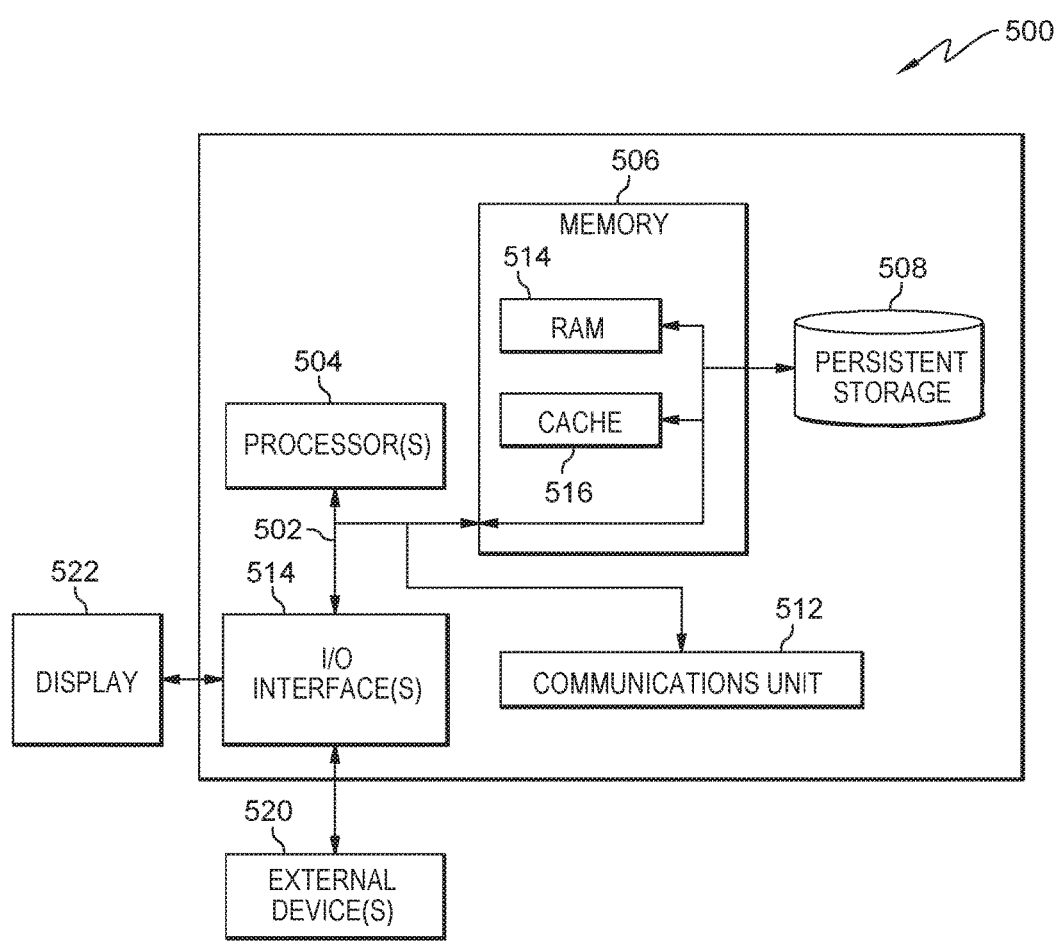
FIG. 5 is a block diagram of internal and external components of the computer systems of FIG. 1, in accordance with an embodiment of the present invention.

FIG. 5 is a block diagram of internal and external components of a computer system 500, which is representative of the computer systems of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media. Software is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer-readable storage medium that is also part of persistent storage 508.

Communications unit 512 provides for communications with other computer systems or devices via a network (e.g., network 108). In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to client computer system 110 through communications unit 512 (e.g., via the Internet, a local area network or other wide area network). From communications unit 512, the software and data can be loaded onto persistent storage 508.

One or more I/O interfaces 514 allow for input and output of data with other devices that may be connected to computer system 500. For example, I/O interface 514 can provide a connection to one or more external devices 520 such as a keyboard, computer mouse, touch screen, virtual keyboard, touch pad, pointing device, or other human interface devices. External devices 520 can also include portable computer-readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product comprising:
one or more non-transitory computer readable storage media and program instructions stored on the one or more non-transitory computer readable storage media, the program instructions comprising:
program instructions to receive a copy of source code and data associated with a sample execution of a set of instructions specified by the copy of the source code;
program instructions to insert, into the set of instructions specified by the copy of the source code, an instruction that corresponds to a code statement that precedes an untraversed code path within the received copy of the source code, as identified by the data associated with the sample execution, wherein the program instructions to insert, into the set of instructions comprise:
program instructions to automatically identify a line that corresponds to code statements in the received copy of source code by recognizing code statements in the received copy of source code that indicate the presence of an untraversed code path, and
program instructions to insert, into the set of instructions, an instruction that corresponds to the identified code statement in the received copy of source code;
program instructions to provide an option to redirect execution of the set of instructions at the inserted instruction, wherein the program instructions to provide an option to redirect execution of the set of instructions at the inserted instruction comprise:
program instructions to suspend execution of the set of instructions at the inserted instruction that corresponds to a code statement that precedes an untraversed code path within the received copy of the source code,
program instructions to display state information associated with the executed set of instructions;
program instructions to provide an option to modify the state information associated with the executed set of instructions,
program instructions to identify a code path that corresponds to the modified state information;

program instructions to, in response to identifying the code path according to the modified state information, redirect execution of the set of instructions specified by the copy of the source code, and program instructions to generate a script to store the modified program state information;

program instructions to generate a test case that increases code coverage based on the redirected execution of the set of instructions; and program instructions to generate data associated with a sample execution of the set of instructions specified by the copy of the source code by executing the instructions specified by the copy of the source code.

* * * * *